United States Patent
Louise et al.

(10) Patent No.: US 9,874,192 B2
(45) Date of Patent: Jan. 23, 2018

(54) METHOD AND DEVICE FOR CONTROLLING AN ALTERNATOR-STARTER OF A MOTOR VEHICLE, AND CORRESPONDING ALTERNATOR-STARTER

(71) Applicant: VALEO EQUIPEMENTS ELECTRIQUES MOTEUR, Creteil (FR)

(72) Inventors: Christophe Louise, Alfortville (FR); Gael Blondel, Epinay-sous-Senart (FR); Ronald Malbranque, Vincennes (FR)

(73) Assignee: Valeo Equipements Electriques Moteur (FR)

( * ) Notice: Subject to any disclaimer, the term of this patent is extended or adjusted under 35 U.S.C. 154(b) by 61 days.

(21) Appl. No.: 14/909,197

(22) PCT Filed: Jul. 29, 2014

(86) PCT No.: PCT/FR2014/051968
§ 371 (c)(1),
(2) Date: Feb. 1, 2016

(87) PCT Pub. No.: WO2015/015117
PCT Pub. Date: Feb. 5, 2015

(65) Prior Publication Data
US 2016/0186711 A1    Jun. 30, 2016

(30) Foreign Application Priority Data
Aug. 1, 2013 (FR) .................... 13 57664

(51) Int. Cl.
*F02N 11/04*    (2006.01)
*H02P 27/08*    (2006.01)
(Continued)

(52) U.S. Cl.
CPC .......... *F02N 11/0859* (2013.01); *F02N 11/04* (2013.01); *H02P 9/48* (2013.01);
(Continued)

(58) Field of Classification Search
CPC ...................................... F02N 11/08
(Continued)

(56) References Cited

U.S. PATENT DOCUMENTS 3,561,557 A * 2/1971 Magnuson ................. 180/65.25
3,688,169 A * 8/1972 Yamaya .............. B60L 11/1805
                                                                                                                          318/114
(Continued)

FOREIGN PATENT DOCUMENTS

| DE | 102009047034 | 5/2011 |
|---|---|---|
| DE | 102011003559 | 8/2012 |

(Continued)

*Primary Examiner* — Bentsu Ro
(74) *Attorney, Agent, or Firm* — Berenato & White, LLC

(57) ABSTRACT

The method according to the invention is implemented in an alternator-starter (1) comprising phase windings (u,v,w) connected to an inverter (3) linked to an onboard electrical network (2) powered by a battery for operation as a starter. The invention involves controlling the inverter in a chopped full-wave control mode when the rotational speed (Ω) of the alternator-starter is lower than at least a threshold speed and in a full-wave control mode when the rotational speed is higher than the threshold speed. According to a specific embodiment, the switching between the chopped full-wave control mode and the full-wave control mode takes place according to a hysteresis cycle using two predefined threshold speeds.

16 Claims, 3 Drawing Sheets

(51) Int. Cl.
*H02P 1/04* (2006.01)
*F02N 11/08* (2006.01)
*H02P 9/48* (2006.01)
*F02D 41/20* (2006.01)

(52) U.S. Cl.
CPC .. *F02D 2041/2048* (2013.01); *F02N 11/0814* (2013.01); *F02N 2011/0896* (2013.01); *F02N 2200/041* (2013.01); *F02N 2200/045* (2013.01); *F02N 2200/063* (2013.01); *F02N 2250/02* (2013.01); *F02N 2300/108* (2013.01)

(58) Field of Classification Search
USPC .......................................... 318/139, 268, 272
See application file for complete search history.

(56) References Cited

U.S. PATENT DOCUMENTS

| | | | |
|---|---|---|---|
| 7,034,412 B2 * | 4/2006 | Kuribayashi | H02P 9/30 |
| | | | 307/10.1 |
| 7,443,044 B2 * | 10/2008 | Shimazaki | F02N 11/00 |
| | | | 290/38 R |
| 7,681,546 B2 | 3/2010 | Lecole et al. | |
| 8,674,633 B2 | 3/2014 | Rouis | |

FOREIGN PATENT DOCUMENTS

| | | |
|---|---|---|
| EP | 1503074 | 2/2005 |
| EP | 2549085 | 1/2013 |
| FR | 2843841 | 2/2004 |
| FR | 2875549 | 3/2006 |
| WO | WO2010010271 | 1/2010 |

* cited by examiner

METHOD AND DEVICE FOR CONTROLLING AN ALTERNATOR-STARTER OF A MOTOR VEHICLE, AND CORRESPONDING ALTERNATOR-STARTER

CROSS-REFERENCE TO RELATED APPLICATIONS AND CLAIM TO PRIORITY

This application is a national stage application of International Application No. PCT/FR2014/051968 filed Jul. 29, 2014, which claims priority to French Patent Application No. 1357664 filed Aug. 1, 2013, the disclosures of which are incorporated herein by reference and to which priority is claimed.

FIELD OF THE INVENTION

The present invention relates to a method and a device for controlling an alternator-starter of a motor vehicle.

The invention also relates to an alternator-starter comprising a device of this type.

BACKGROUND OF THE INVENTION

Considerations of energy saving and reduction of pollution, above all in an urban environments, are leading motor vehicle manufacturers to equip their models with an automatic starting/stopping system, such as the system known by the name of Stop and Go (registered trade mark).

As recalled by VALEO EQUIPEMENTS ELECTRIQUES MOTEUR in patent application FR2875549, the vehicles are enabled to function according to the Stop and Go mode (registered trade mark) by means of a reversible electrical machine, or alternator-starter, which is coupled to the thermal engine.

A typical Stop and Go (registered trademark) situation is that of stoppage at a red light. When the vehicle stops at the light, the thermal engine is automatically stopped, then, when the light turns green, the engine is restarted by means of the alternator-starter, as a result of detection by the system that the driver has pressed the clutch pedal, or any other action which indicates the driver's wish to restart his vehicle.

The development of these systems now imposes new constraints on motor vehicle parts manufacturers relating to compliance with minimum voltage thresholds of the battery during the current requirement when the starter is started. Thus, in their specifications, the motor vehicle manufacturers define a voltage threshold which is habitually between 7 and 9 volts for a 12 V network, below which the battery voltage must not drop.

During the starting of the thermal engine, the voltage of the on-board network of the vehicle thus remains at a value which is sufficient to guarantee the expected functioning of the equipment, and not to cause the occupants inconvenience by disrupting the operation of a car radio, for example Generally, on alternator-starter which is used in an engine, when the inverter is activated after the stoppage, full-wave control will allow the stator current to be established up to a maximum value which will depend only on the battery voltage and the resistance of the supply circuit (resistance of the phase windings, of the supply cable, internal resistance of the battery and of the switching elements), since the counter-electromotive force is negligible.

The current requirement, which can reach approximately 1000 A, creates a substantial voltage drop on the on-board electrical network, and requires power electronics of a size suitable for this high current.

In the patent application FR2843841, the company VALEO EQUIPEMENTS ELECTRIQUES MOTEUR proposes a device for control of an alternator-starter of a vehicle which can supply a voltage higher than that present on the on-board electrical network, such as to mitigate the voltage drop.

However, it will be appreciated that this solution does not solve the problem of the excess size of the power electronics, which is necessary only during the short transitory phase before the starter gets up to speed.

SUMMARY OF THE INVENTION

The objective of the present invention is thus to limit this current requirement at the time of starting.

According to a first aspect, it relates to a method for controlling an alternator-starter of a motor vehicle, this alternator-starter comprising phase windings connected to an inverter which is connected to an on-board electrical network supplied by a battery for operation as a starter.

According to the method of the invention, the inverter is controlled in a chopped full-wave control mode when the speed of rotation of the alternator-starter is lower than at least a predetermined threshold speed, and in a full-wave control mode when the speed of rotation of the alternator-starter is higher than the said at least one predetermined threshold speed.

According to a particular embodiment of the method, the switching between the chopped full-wave control mode and the full-wave control mode takes place according to a hysteresis cycle which uses two predetermined threshold speeds.

According to a particular characteristic, a duty cycle of this chopped full-wave control depends on the speed of rotation of the alternator-starter.

Alternatively or simultaneously, a duty cycle of this chopped full-wave control advantageously depends on a supply voltage of the on-board electrical network.

Also alternatively or simultaneously, a duty cycle of this chopped full-wave control highly advantageously depends on a temperature of the phase windings.

The invention also relates to a control device of an alternator-starter of a motor vehicle which can implement the above-described method.

This device is of the type comprising an electronic control unit which controls an inverter connected to an on-board electrical network which is supplied by a battery, and is designed to be connected to phase windings of the alternator-starter for operation as a starter.

According to the device of the invention, the electronic control unit comprises:
- means for acquisition of a speed of rotation of the alternator-starter;
- means for storage of at least one predetermined threshold speed;
- means for comparison of the speed of rotation at the said at least one predetermined threshold speed;
- means for generation of first control signals which produce first chopped full-wave phase voltages or second control signals which produce second full-wave phase voltages, according to states of the means for comparison.

According to a particular characteristic, this electronic control unit additionally comprises means for controlling duty cycles of the first phase voltages according to the speed of rotation of the alternator-starter.

Alternatively or simultaneously, the electronic control unit additionally advantageously comprises:

means for measuring a supply voltage of the on-board electrical network; means for controlling duty cycles of the first phase voltages, according to this supply voltage.

Also alternatively or simultaneously, the electronic control unit highly advantageously comprises:

means for measuring or estimating a temperature of the phase windings;

means for controlling duty cycles of the first phase voltages according to this temperature.

Advantage will be derived from an alternator-starter of a motor vehicle which is distinguished in that it comprises a control device with the above characteristics.

These few essential specifications will have made apparent to persons skilled in the art the advantages provided by the invention in comparison with the prior art.

The detailed specifications of the invention are provided in the description which follows in association with the appended drawings. It should be noted that these drawings serve the purpose simply of illustrating the text of the description, and do not constitute in any way a limitation of the scope of the invention.

DETAILED DESCRIPTION OF THE PREFERRED EMBODIMENT(S)

An alternator-starter 1 is generally a polyphase rotary electrical machine which is supplied by the on-board electrical network 2 when it is operating as a starter, or which supplies electrical energy to this network 2 when it is operating as an alternator.

A reversible DC/AC converter 3 which is connected to the stator 4 makes it possible to implement these two operating modes.

Figure 1:
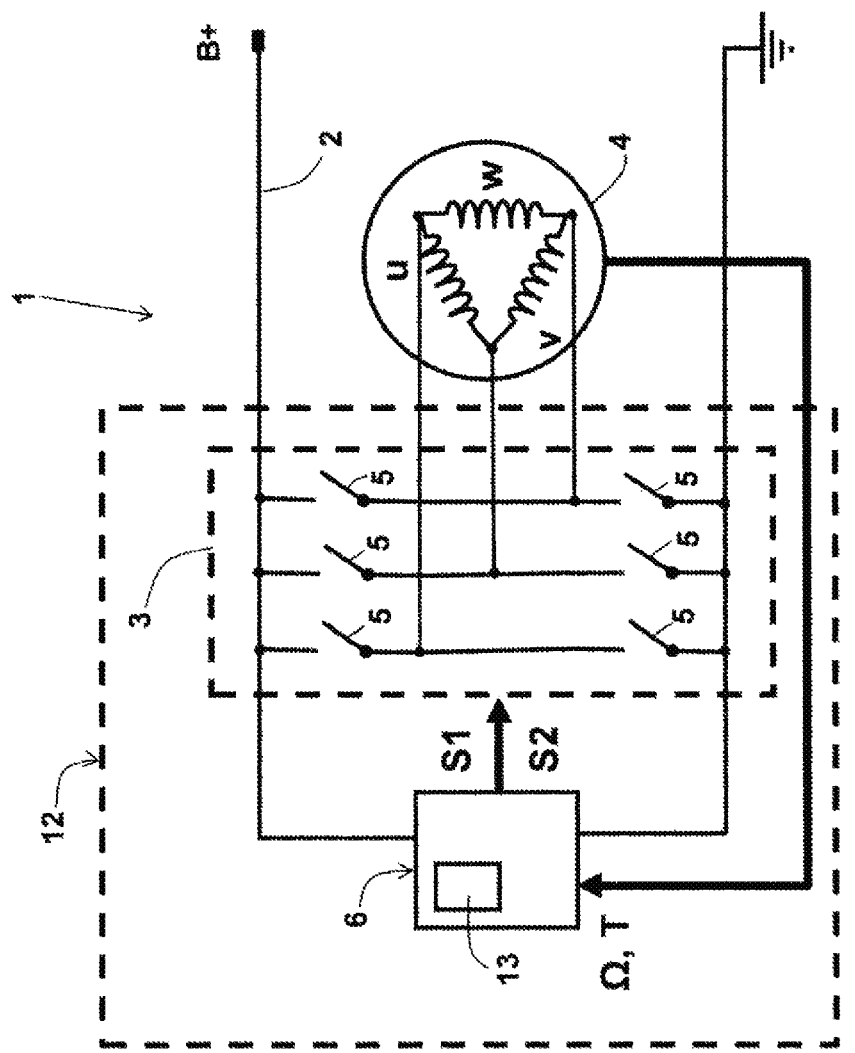
FIG. 1 is a simplified wiring diagram of an alternator-starter of a motor vehicle, comprising a control device according to the invention.

As represented schematically in FIG. 1 (in the case of a three-phase machine by simplification), the reversible DC/AC converter 3 comprises semiconductor switching elements 5, mostly MOSFET technology power transistors organised in the form of a bridge.

These switching elements 5 are controlled by an electronic control unit 6, such that the converter 3 constitutes a synchronous rectifier for operation as an alternator of the alternator-starter, and constitutes a polyphase generator, or inverter, which creates a rotary field in the stator 4 for operation as a starter.

According to the method of the invention, the inverter 3 is controlled either in chopped full-wave control mode, or in full wave control mode according to the range of the speed of rotation $\Omega$ of the alternator-starter 1.

Figure 2:
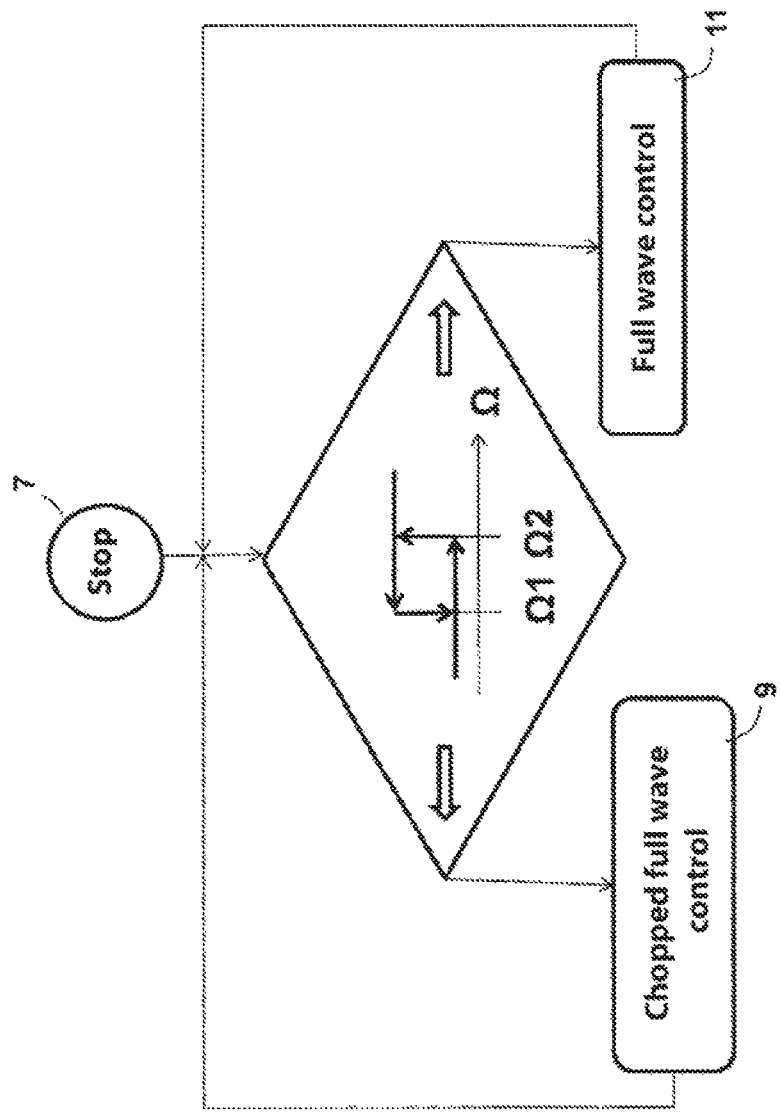
FIG. 2 is a diagram of states-transitions of the control method of an alternator-starter of a motor vehicle according to the invention.

As shown in FIG. 2, in this particular embodiment, the switching between the chopped full-wave control mode and the full-wave control mode is switching with hysteresis carried out by means of two predetermined threshold speeds $\Omega1$ and $\Omega2$, where $\Omega2$ is greater than $\Omega1$.

Figure 3:
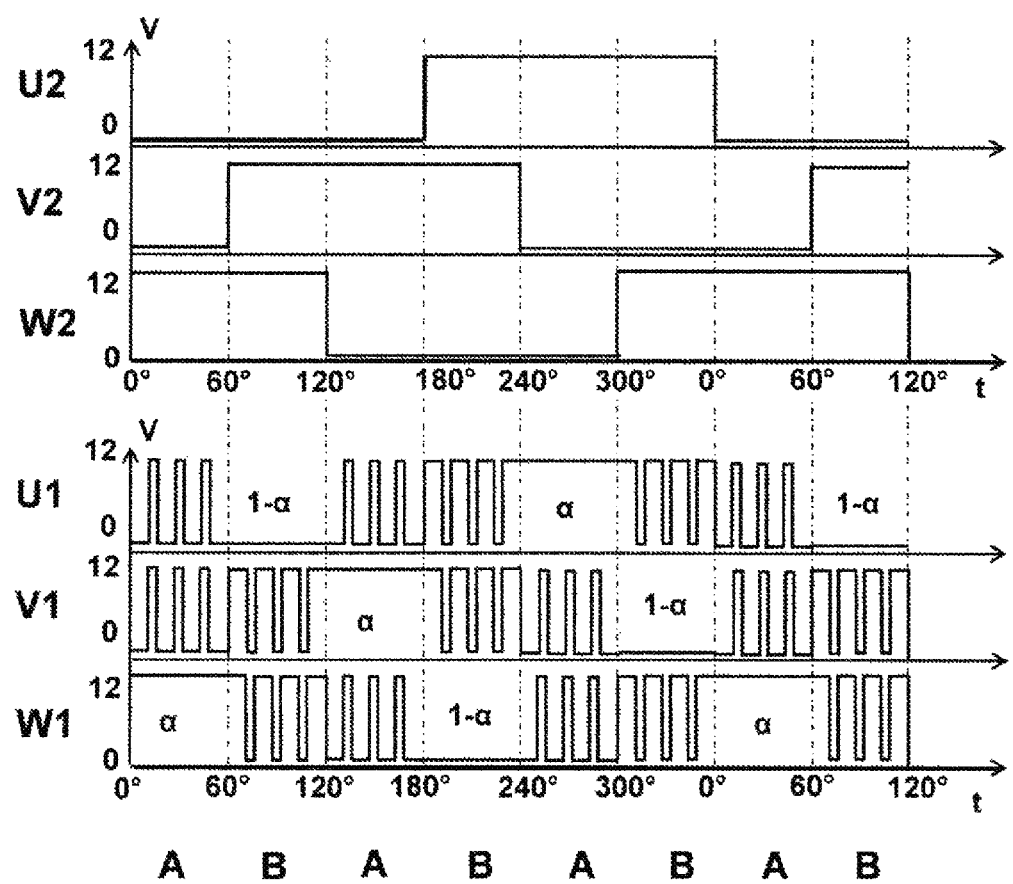
FIG. 3 shows an example of phase voltage timing diagrams produced by the control device of an alternator-starter of a motor vehicle according to the invention.

Starting from the stoppage 7, where the speed of rotation $\Omega$ is equal to zero, for as long as the increasing speed $\Omega$ remains lower than the predetermined threshold speed $\Omega2$, the inverter 3 is controlled in the chopped full-wave control mode 9, i.e., within the context of a three-phase machine, first phase voltages U1, V1, W1 applied to the phase windings u, v, w of the stator 4 are chopped, as shown clearly in FIG. 3.

When the speed of rotation $\Omega$ reaches the predetermined threshold speed $\Omega2$, the inverter 3 control is switched to the full-wave control mode 11, i.e., again within the context of a three-phase machine, second phase voltages U2, V2, W2 applied to the phase windings u, v, w of the stator 4 have rectangular waveforms which are offset by 120°, as also shown in FIG. 3.

The switching from the full-wave control mode to the chopped full-wave control mode takes place at a decrease in the speed of rotation $\Omega$, when the latter becomes lower than the predetermined threshold speed $\Omega1$.

For a three-phase machine, the chopped full-wave control 9 leads to two cases A, B:

A—one phase is commanded to the supply voltage B+ (in this case 12 V), and two phases are earthed: in this case the method according to the invention amounts to chopping the two earthed phases of the full-wave control mode with a duty cycle a, and the supply voltage phase B+ continues to be controlled at the supply voltage B+;

B—two phases are commanded to the supply voltage B+ (in this case 12 V), and one phase is earthed: in this case the method according to the invention amounts to chopping the two phases at B+ of the full-wave control with a complementary duty cycle 1-α, whereas the earthed phase continues to be earthed.

The duty cycle a affects directly the maximum current value reached at starting, and consequently depends on different parameters:

supply voltage B+ speed of rotation $\Omega$ of the machine 1 temperature T of the stator 4.

For implementation of this method, the electronic control unit 6 of the control device 12 according to the invention thus comprises means for measurement of the supply voltage B+, and means for measurement of the temperature T of the stator 4, as well as means for acquisition of the speed of rotation $\Omega$, means 13 for storage of the first and second predetermined threshold speeds $\Omega1$, $\Omega2$, substantially equal to 400 rpm and 500 rpm in this particular embodiment, and means for comparison of this speed of rotation $\Omega$ with these first and second predetermined threshold speeds $\Omega1$, $\Omega2$.

This electronic control unit 6 comprises means for generation of first and second signals S1, S2 for control of the semiconductor switching elements 5 which produce at the output of the inverter 3 respectively first chopped full-wave phase voltages U1, V1, W1 or second full-wave phase voltages U2, V2, W2 according to output states of comparison of the means for comparison, according to the value of the speed of rotation $\Omega$ relative to the predetermined threshold speeds $\Omega1$, $\Omega2$.

The first control signals S1 preferably have a frequency of between 1 KHz and 5 KHz.

The electronic control unit 6 also comprises means for controlling the duty cycles of the first phase voltages U1, V1, W1, set, according to the phases, to a common value a which depends on the supply voltage B+, the speed of rotation Ω, and the temperature of the stator 4, or to its complementary value 1-α by generating appropriate first control signals S1, The electronic control unit 6 is preferably produced in the form of a microcontroller, the microprogram of which comprises instructions which are representative of the method according to the invention.

The control device 12 according to the invention, comprising the inverter 3 and an electronic control unit 6, is advantageously integrated on the rear bearing of the alternator-starter 1.

Since the requirement for current at starting is reduced, the semiconductor switching elements 5 do not need to be oversized.

This results in a reduction of the costs, which provides the alternator-starter according to the invention with a certain competitive advantage.

As will be appreciated, the invention is not limited simply to the above-described preferred embodiments.

The timing diagrams of the phase voltages U1, V1, W1; U2, V2, W2 are provided only by way of example for a three-phase machine; similar timing diagrams could illustrate a description relating to a machine with a larger number of phases, and in particular double three-phase.

The numerical values of the first and second predetermined speeds Ω1, Ω2 are given for a type of alternator-starter already marketed by the applicant company, which the method and the device according to the invention are intended to improve.

Other numerical values will be predetermined according to the electrical-mechanical characteristics of other types or models.

The invention thus incorporates all the possible variant embodiments which would remain within the context defined by the following claims.

The invention claimed is:

1. A method for controlling an alternator-starter (1) of a motor vehicle using an electronic control unit, said alternator-starter (1) comprising phase windings (u, v, w) connected to an inverter (3) which is connected to an on-board electrical network (2) supplied by a battery for operation as a starter, said electronic control unit comprising:
    means for acquisition of a speed of rotation (Ω) of said alternator-starter (1);
    means (13) for storage of at least one predetermined threshold speed (Ω1, Ω2);
    means (8, 10) for comparison of a speed of rotation (Ω) with said at least one predetermined threshold speed (Ω1, Ω2); and
    means for generation of first control signals (S1) which produce first chopped full-wave phase voltages (U1, V1, W1) or second control signals (S2) which produce second full-wave phase voltages (U2, V2, W2), according to states of said means (8, 10) for comparison, said method comprising the steps of:
    controlling said inverter (3) in a chopped full-wave control mode (9) when the speed of rotation (Ω) of said alternator-starter (1) is lower than at least a predetermined threshold speed (Ω1, Ω2); and
    switching control of said inverter to a full-wave control mode (11) when the speed of rotation (Ω) of said alternator-starter (1) is higher than said at least one predetermined threshold speed (Ω1, Ω).

2. Method for controlling an alternator-starter (1) of a motor vehicle according to claim 1, wherein the switching between the chopped full-wave control mode (9) and the full-wave control mode (11) takes place according to a hysteresis cycle which uses two predetermined threshold speeds (Ω1, Ω2).

3. Method for controlling an alternator-starter (1) of a motor vehicle according to claim 2, wherein a duty cycle (α) of said chopped full-wave control (9) depends on said speed of rotation (Ω).

4. Method for controlling an alternator-starter (1) of a motor vehicle according to claim 2, wherein a duty cycle (α) of said chopped full-wave control (9) depends on a supply voltage (B+) of said on-board electrical network (2).

5. Method for controlling an alternator-starter (1) of a motor vehicle according to claim 2, wherein a duty cycle (α) of said chopped full-wave control (9) depends on a temperature (T) of said phase windings (u, v, w).

6. Method for controlling an alternator-starter (1) of a motor vehicle according to claim 1, wherein a duty cycle (α) of said chopped full-wave control (9) depends on said speed of rotation (Ω).

7. Method for controlling an alternator-starter (1) of a motor vehicle according to claim 1, wherein a duty cycle (α) of said chopped full-wave control (9) depends on a supply voltage (B+) of said on-board electrical network (2).

8. Method for controlling an alternator-starter (1) of a motor vehicle according to claim 1, wherein a duty cycle (α) of said chopped full-wave control (9) depends on a temperature (T) of said phase windings (u, v, w).

9. A controller for an alternator-starter (1) of a motor vehicle of the type comprising an electronic control unit (6) which controls an inverter (3) connected to an on-board electrical network (2) which is supplied by a battery, and is designed to be connected to phase windings (u, v, w) of said alternator-starter (1) for operation as a starter, wherein said electronic control unit (6) comprises:
    means for acquisition of a speed of rotation (Ω) of said alternator-starter (1);
    means (13) for storage of said at least one predetermined threshold speed (Ω1, Ω2);
    means (8, 10) for comparison of said speed of rotation (Ω) at said at least one predetermined threshold speed (Ω1, Ω2);
    means for generation of first control signals (S1) which produce first chopped full-wave phase voltages (U1, V1, W1) or second control signals (S2) which produce second full-wave phase voltages (U2, V2, W2), according to states of said means (8, 10) for comparison; wherein,
    when said alternator-starter phase windings (u, v, w) are connected to said inverter (3) for operation as a starter, said inverter (3) is controlled in a chopped full-wave control mode (9) when the speed of rotation (Ω) of said alternator-starter (1) is lower than at least a predetermined threshold speed (Ω1, Ω2), and in a full-wave control mode (11) when the speed of rotation (Ω) of said alternator-starter (1) is higher than said at least one predetermined threshold speed (Ω1, Ω).

10. A controller for controlling an alternator-starter (1) of a motor vehicle according to claim 9, wherein said electronic control unit (6) additionally comprises means for controlling duty cycles (α, 1-α) of said first phase voltages (U1, V1, W1) according to said speed of rotation (Ω).

11. Alternator-starter (1) of a motor vehicle, comprising a controller according to claim 10.

12. A controller for controlling an alternator-starter (1) of a motor vehicle according to claim 9, wherein said electronic control unit (6) additionally comprises:

means for measuring a supply voltage (B+) of said on-board electrical network (2);

means for controlling duty cycles (α, 1-α) of said first phase voltages (U1, V1, W1), according to said supply voltage (B+).

13. Alternator-starter (1) of a motor vehicle, comprising a controller according to claim 12.

14. A controller for controlling an alternator-starter (1) of a motor vehicle according to claim 9, wherein said electronic control unit (6) additionally comprises:

means for measuring or estimating a temperature (T) of said phase windings (u, v, w);

means for controlling duty cycles (α, 1-α) of said first phase voltages (U1, V1, W1) according to said temperature (T).

15. Alternator-starter (1) of a motor vehicle, comprising a controller according to claim 14.

16. Alternator-starter (1) of a motor vehicle, wherein it comprises a controller according to claim 9.

* * * * *